United States Patent [19]

Sturgis

[11] Patent Number: 4,974,623
[45] Date of Patent: Dec. 4, 1990

[54] HEAT-SENSITIVE CUT-OFF FOR GAS CONDUITS AND THE LIKE, AND METHOD OF MANUFACTURE

[76] Inventor: Malcolm B. Sturgis, 6227 Rosebury Ave., St. Louis, Mo. 63105

[21] Appl. No.: 479,859

[22] Filed: Feb. 14, 1990

[51] Int. Cl.5 ............................................. F16K 17/40
[52] U.S. Cl. ...................................... 137/74; 137/75; 251/149.6
[58] Field of Search ............................ 137/72, 74, 75; 251/149.6

[56] References Cited

U.S. PATENT DOCUMENTS

| | | | |
|---|---|---|---|
| 2,048,389 | 7/1936 | Johnsen | 137/75 |
| 3,245,423 | 4/1966 | Hansen et al. | 137/75 X |
| 3,313,312 | 4/1967 | Weese | 137/75 |
| 3,474,810 | 10/1969 | Welsh | 137/75 |
| 3,532,101 | 10/1970 | Snyder, Jr. | 137/75 |
| 4,088,436 | 5/1978 | Alferes | 137/74 X |
| 4,280,523 | 7/1981 | Norton | 137/74 |
| 4,290,440 | 9/1981 | Sturgis | 137/75 |
| 4,488,566 | 12/1984 | Hicks | 137/74 |
| 4,792,115 | 12/1988 | Jindra et al. | 137/74 X |
| 4,825,893 | 5/1989 | Gailey | 137/75 |

FOREIGN PATENT DOCUMENTS 4530872 1/1966 Japan .................................. 137/74

Primary Examiner—John Rivell
Attorney, Agent, or Firm—Senniger, Powers, Leavitt & Roedel

[57] ABSTRACT

An improved heat sensitive cut-off for blocking the flow through a gas conduit or the like of the type comprising first and second cut-off members disposed in the conduit which co-operate to block flow through the conduit when they are brought together. The first cut-off member has a socket therein. A spring biases the cut-off members together, and a spacer between the cut-off members for separates them to permit flow through the conduit. The spacer has a portion penetrating partway into the socket in the first cut-off member. A plug of a relatively low melting point material is located in the bottom of the socket for temporarily preventing the spacer from penetrating further into the socket. The socket and the spacer are configured so that when the plug melts the spacer can penetrate further into the socket sufficiently that the spring can move the cut-off members together to block the flow through the conduit. The first cut-off member and the spacer are secured together mechanically or with an adhesive to prevent them from separating and interfering with the proper operation of the cut-off.

17 Claims, 3 Drawing Sheets

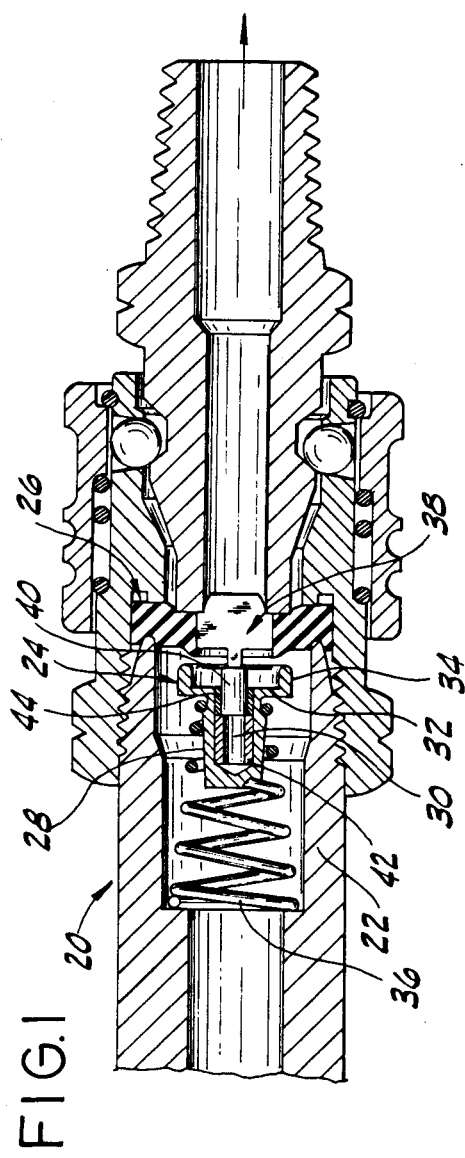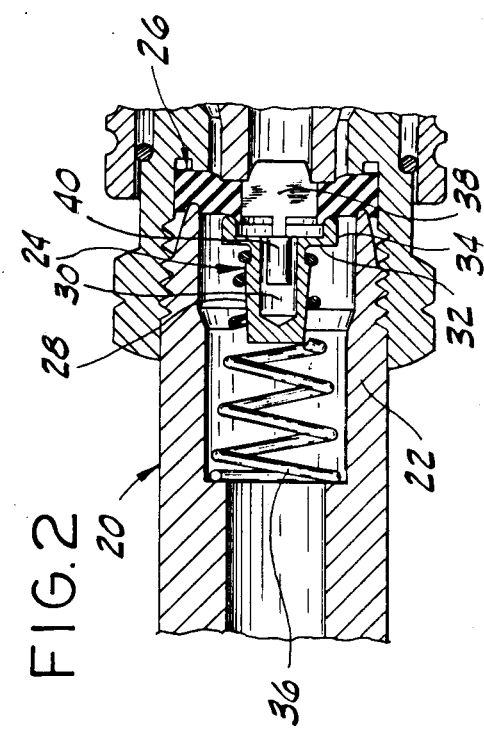

HEAT-SENSITIVE CUT-OFF FOR GAS CONDUITS AND THE LIKE, AND METHOD OF MANUFACTURE

BACKGROUND OF THE INVENTION

This invention relates to heat-sensitive cut-off devices for gas conduits and the like, and to a method of manufacturing heat-sensitive cut-offs.

A variety of heat-sensitive cut-off devices have been made to cut-off or stop the flow through a conduit if the temperature rises to a critical level. These devices are typically used on gas supply conduits and the like, in order to stop the flow of gas in the presence of heat or flame. One type of device includes a spring-biased closure member that is temporarily secured from moving to a closed position by soldering. An example of such a device is shown in U.S. Pat. No. 4,290,440. When the melting point of the solder is exceeded the solder melts, freeing the closure member, which can then move to its closed position, stopping the flow through the conduit.

One problem encountered with some of these prior devices is that the solder is exposed to the flow through the conduit, and as the solder melts it is driven or blown by the flow through the conduit to interfere with the operation of the cut-off device. To avoid this problem, the closure member is sometimes secured in a blind hole so that the melting solder is sheltered from the passing gas. However, it is particularly difficult to solder the closure member in a blind hole. The joint must be sufficiently strong to prevent the closure member from inadvertently closing, but it must also readily release when the temperature reaches a critical level. In one manufacturing process, flux is applied to the closure member and to the blind hole in which it is to be mounted, over the appropriate length of the soldered joint. Solder is then applied to the closure member and the closure member is inserted into the blind hole. The assembly is then subjected to a reflow process in a furnace. This is a time consuming process, and the resulting parts are still not completely reliable, and must be tested. A fusible plug could be provided in the bottom of the blind hole to support a spacer that keeps the valve open. When the plug melts the spacer could penetrate into the blind hole, allowing the valve to close. The melted material from the plug would be contained in the blind hole, sheltered from the passing gas, and thus would not interfere with the closing of the valve. However, nothing would prevent the spacer from becoming separated from the blind hole, which could result in misalignment between the spacer and the hole and impair the operation of the valve.

SUMMARY OF THE INVENTION

It is among the objects of the present invention to provide a heat-sensitive cut-off for gas conduits and the like that reliably closes when its critical temperature is reached, which is constructed to minimize the incomplete closure caused by interference from melted solder experienced with some prior devices, and which is constructed to be secure and resist separation to prevent misalignment that could impair operation of the cut-off. It is also among the objects of this invention to provide such a cut-off that is of relatively simple and inexpensive construction, but which will reliably operate without premature closure. It is also among the objects of this invention to provide such a cut-off that is relatively quick and easy and inexpensive to assemble. It is another object of this invention to provide a quick, easy and inexpensive method for assembling a heat sensitive cut-off; to provide such a method that eliminates the soldering and reflow processes, and to provide such a method that produces reliable cut-offs.

The heat-sensitive cut-off of this invention is adapted for blocking the flow through a gas conduit or the like when the temperature exceeds a critical temperature. Generally, the cut-off comprises first and second cut-off members disposed in the conduit which co-operate to block flow through the conduit when they are brought together. The first cut-off member has a socket therein. A biasing means, such as a spring, biases the cut-off members together. A spacer is positioned between the first and second cut-off members to separate the cut-off members to permit flow through the conduit. The spacer has an end portion penetrating partway into the socket in the first cut-off member. A plug of a relatively low melting point material is located in the bottom portion of the socket for temporarily preventing the spacer from penetrating further into the socket. The socket and the spacer are configured so that when the plug melts, the spacer can penetrate further into the socket sufficiently to allow the biasing means to move the cut-off members together to block the flow through the conduit. The first cut-off member is preferably positioned in the conduit upstream relative to the second cut-off member, and the spring biases the first cut-off member toward the second cut-off member.

According to the principles of this invention, the cut-off includes means for preventing the first cut-off member and the spacer from separating. This means may comprise a low temperature adhesive between the socket and the spacer. Alternatively, this means may comprise means on the first cut-off member for engaging the spacer.

The plug is preferably configured to occupy a greater volume in solid form than in liquid form, so that when the plug melts in the socket there is room for the spacer to penetrate further into the socket.

The method of this invention provides for the quick and easy assembly of heat sensitive cut-offs. The method generally comprises the steps of providing first and second cut-off members configured to co-operate to block flow through the conduit when they are brought together, the first cut-off member having a socket therein. A plug of a material having a relatively low melting point is inserted into the bottom portion of the socket. A spacer, configured to penetrate into the socket, is provided between the first and second cut-off members, and inserted into the socket until further penetration is prevented by the plug. Means for biasing the cut-off members together is provided so that when the plug in the socket melts and the spacer can penetrate further into the socket, the biasing means moves the cut-off members together to block the flow through the conduit.

The method further includes the step of securing the first cut-off member and the spacer from separation. This step may include providing an adhesive material having a relatively low melting point between the walls of the socket and the spacer. Alternatively, this step may include the use of a first cut-off member that includes a deformable portion, and a spacer that has a shoulder thereon. The first cut-off member and the spacer can then be secured by deforming the deformable portion of the first cut-off member to engage the shoulder on the spacer after the spacer has been inserted partway into the socket. A third alternative involves the use of a retaining ring held by the first cut-off member and engageable with a shoulder on the spacer.

The heat sensitive cut-off of this invention is thus of simple and inexpensive construction, and is relatively inexpensive to manufacture. The plug and the spacer co-operate to keep the cut-off open, and because the plug provides a physical block to the further penetration of the spacer into the socket, the cut-off cannot close until the plug melts, and thus the cut-off cannot prematurely close. However, once the critical temperature is reached, the plug melts and there is no further obstacle to the closure of the cut-off, so the cut-off reliably closes. The plug is contained in the bottom of the socket so the melted material is protected from the flow through the conduit, and is therefore unlikely to interfere with the proper seating of the cut-off members. The means for preventing the first cut-off member and the spacer from separating, ensures that the cut-off remains intact so that its proper operation does not become impaired.

The method of the present invention provides a quick, easy, and relatively inexpensive way of manufacturing reliable heat-sensitive cut-offs. The method eliminates the difficult and time-consuming soldering and reflow processes, and eliminates defects that result when the soldering and reflow processes are not properly executed. Yet it provides a cut-off that remains intact so that its proper operation does not become impaired.

These and other advantages will be in part apparent and in part pointed out hereinafter.

BRIEF DESCRIPTION OF THE DRAWINGS

FIG. 1 is a longitudinal cross-sectional view of a first embodiment of a heat-sensitive cut-off constructed according to the principles of this invention, in the open position;

FIG. 2 is a longitudinal cross-sectional view of the first embodiment in the closed position;

Corresponding reference numerals indicate corresponding parts throughout the several views of the drawings.

DETAILED DESCRIPTION OF THE PREFERRED EMBODIMENTS

Figure 3:
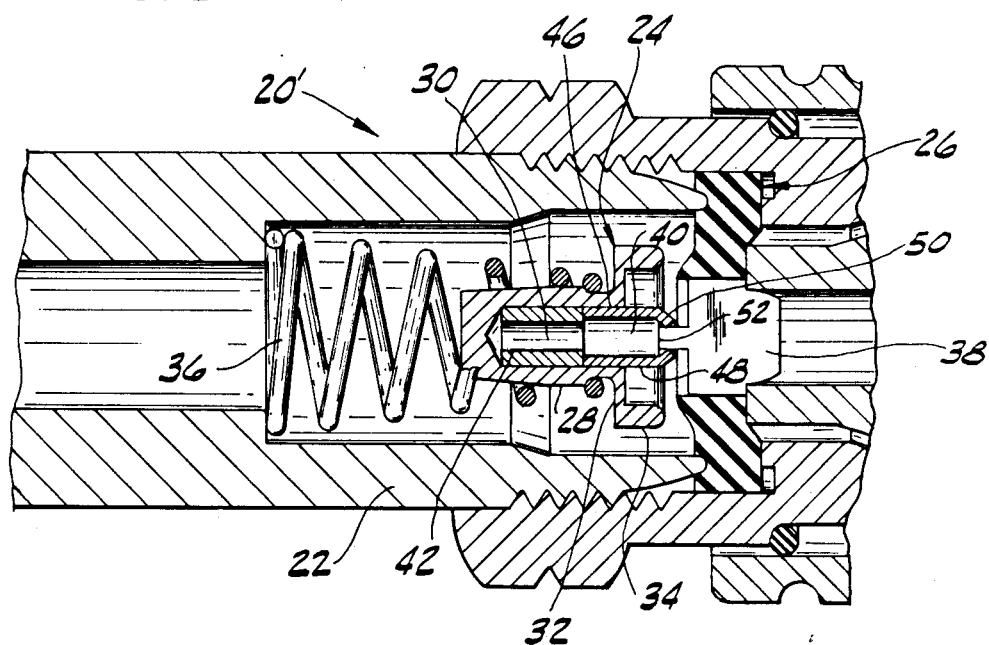
FIG. 3 is an enlarged longitudinal cross-sectional view of a second embodiment of a heat-sensitive cut-off constructed according to the principles of this invention.

A first embodiment of heat-sensitive cut-off constructed according to the principles of this invention, indicated generally as 20, is shown in longitudinal cross-section in FIGS. 1 and 2. FIG. 1 shows the cut-off 20 in its open position, and FIG. 2 shows the cut-off 20 in its closed position.

The cut-off 20 is shown disposed in a conduit 22, which may be, for example, a conduit for conducting natural gas, or some other substance. The cut-off 20 comprises first and second cut-off members 24 and 26, respectively, disposed in the conduit 22. The cut-off members are preferably oriented in the conduit 22 so that the first cut-off member 24 is upstream of second cut-off member 26 in terms of flow through the conduit 22. The first cut-off member 24 is generally cup-shaped and comprises a generally cylindrical body 28 having socket 30 extending into the cylindrical body. The socket 30 has a closed bottom, and an open end, which preferably faces downstream in the conduit, toward the second cut-off member 26. The open end is surrounded by an annular flange 32., and the outer edge of the flange has an axial sealing rim 34 for sealing with the second cut-off member 26. The first and second cut-off members 24 and 26 are configured so that they co-operate to block the flow through the conduit 22 when the cut-off members are brought together.

The cut-off 20 also includes means for biasing the cut-off members together. This means is preferably a tapering coil spring 36, the wide end of which engages a shoulder in the conduit 22 and the narrow end of which surrounds the body 28 of the first cut-off member 24, abutting the back of the flange 32.

A spacer 38, having an end portion 40 adapted to penetrate the socket 30, is disposed between the first and second cut-off members 24 and 26, with the end portion 40 penetrating into the socket 30. The spacer 38 may be, but preferably is not, integral with the second cut-off member 26. A plug 42, made of a material having a relatively low melting point, for example a eutectic alloy solder of lead and tin, is disposed in the bottom of the socket 30, below and supporting the end portion 40 of the spacer. The plug 42 prevents the end portion 40 from penetrating further into the socket 30, even under the bias of the coil spring 36. The plug is preferably configured so it occupies a greater volume in solid form than in liquid form. For example, the plug 42 may have a generally hollow, tubular configuration, or some other suitable configuration.

The socket 30 and the end portion 40 of the spacer 38 are configured so that when the plug 42 melts, the end portion 40 of the spacer 38 can penetrate further into the socket 30 sufficiently to allow the first cut-off member 24 to move against the second cut-off member 26 under the bias of the spring 36 (see FIG. 2). As noted above, the plug 42 is preferably configured so that it does not occupy as much volume when it is melted, which allows the end portion 40 to penetrate further into the socket 30 into the volume relinquished by the melting of the plug 42. Alternatively, or in addition, the socket 30 and the end portion 40 of the spacer 38 can be configured to allow the material from the melting plug to flow out of the socket, thereby making room for the end portion 40 to penetrate further into the socket.

The cut-off 20 further comprises means for preventing the first cut-off member 24 and the spacer 38 from separating. This means may comprise a relatively low temperature adhesive 44 between the socket 30 and the end portion 40 of the spacer 38. The adhesive 44 holds the spacer 38 relative to the first cut-off member 24, so that the end portion 40 does not become misaligned with the socket 30. The adhesive is selected so that it melts in advance of the plug 42, so that the adhesive does not interfere with the operation of the cut-off 20.

A second embodiment of a heat-sensitive cut-off constructed according to the principles of this invention, indicated generally as 20', is shown in longitudinal cross-section in FIG. 3. The cut-off 20' is substantially similar in construction to the cut-off 20, and corresponding parts are identified with corresponding reference numerals. However, cut-off 20' does not employ adhesive 44 between the socket 30 and the end portion 40 as the means for preventing the cut-off member 24 and the spacer 38 from separating. Instead, a sleeve or tube 46 is press fit into the open end of the socket (preferably, but not necessarily after the installation of plug 42). The tube 46 has a portion 48 projecting axially downstream from the socket 30, with deformable tabs 50. The end portion 40 of the spacer is inserted through the tube 46, partway into the socket 30, and the tabs 50 are deformed to engage a shoulder 52 on the spacer 38 to retain the spacer in the socket.

Figure 4:
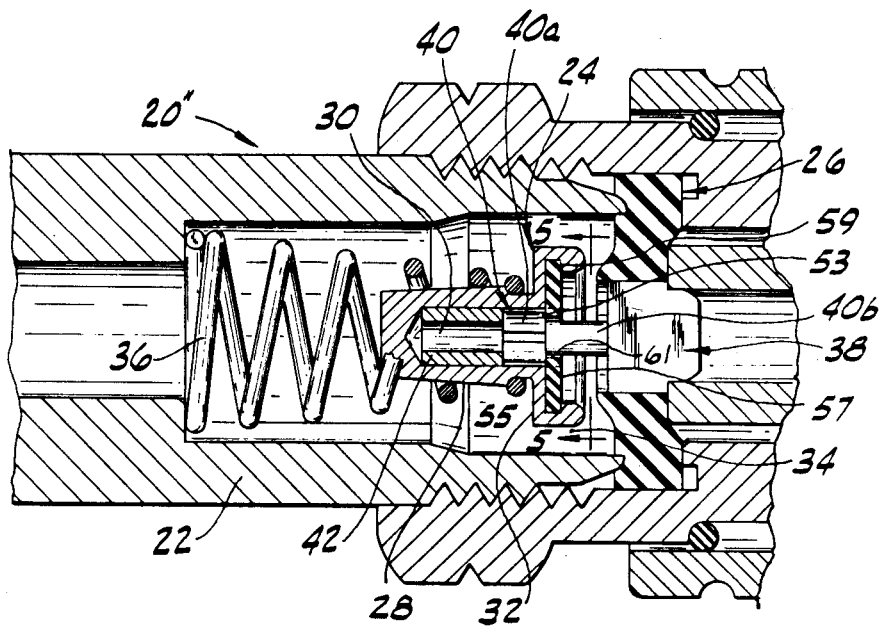
FIG. 4 is a view similar to FIG. 3 showing a third embodiment of a heat-sensitive cut-off of the present invention.
Figure 5:
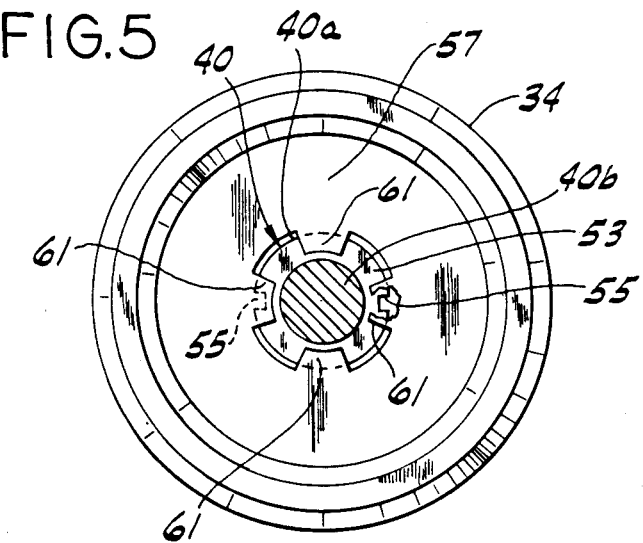
FIG. 5 is a cross-sectional view taken on line 5—5 of FIG. 4.

A third embodiment of a heat-sensitive cut-off of this invention, indicated generally at 20″, is shown in FIGS. 4 and 5. This cut-off is generally similar to cut-offs 20 and 20′ and corresponding parts are designated by the same reference numerals. In this embodiment, the end portion 40 of the spacer has a relatively large diameter upstream section 40a and a smaller diameter downstream section 40b. Both sections are generally circular in radial cross section, thus forming an annular shoulder 53 therebetween. The large diameter section has a pair of diametrically opposed grooves or channels 55 therein extending generally axially of the spacer from the upstream end of the spacer to the shoulder 53. A retainer in the form of an annular retaining member or ring 57 of resilient material (e.g., plastic or spring steel) is installed in a circular groove 59 in the sealing rim 34 of the first cut-off member 24 and is thus held in fixed axial position relative to the cut-off member. The retaining ring has an inner edge margin comprising a plurality of tabs or teeth 61 which project radially inwardly a distance sufficient to engage the shoulder 53 on the end portion 40 of the spacer, thus preventing separation of the spacer and the first cut-off member.

When assembling the spacer 38 and the first cut-off member 24, after installation of the retaining ring 57 in its groove 59, the end portion 40 of the spacer 38 is inserted through the retaining ring partway into the socket. The teeth 61 deflect to permit the insertion of the relatively large diameter upstream section 40a of the spacer past the ring. As soon as the shoulder 53 on the spacer passes the ring, the teeth 61 spring back to their original undeformed position in which they are engageable with the shoulder 53 to prevent separation of the cut-off member 24 and the spacer 40. In the event the plug 42 melts, allowing the end portion 40 of the cut-off to move further into the socket 30, the channels 55 in the large diameter section 40a function as vents to vent gas and perhaps small amounts of melted plug material from the socket downstream past the relatively large diameter section 40a of the spacer.

The method of this invention for making a cut-off comprises the steps of providing first and second cut-off members 24 and 26 configured to co-operate to block flow through the conduit when they are brought together, the first cut-off member having a socket 30 therein. A plug 42 made from a material having a relatively low melting point is inserted into the bottom portion of the socket 30. A spacer 38, having an end portion 40 configured to penetrate the socket 30, is disposed between the first and second cut-off members 24 and 26, and the end portion 40 is inserted into the socket until it abuts the plug 42 and cannot penetrate into the socket 30 any further. The spring 36 in provided to bias the first and second cut-off members together so that when the plug 42 melts, the end portion 40 of the spacer 38 can penetrate further into the socket 30, allowing the cut-off members to move together to block the flow through the conduit.

The method further comprises the step of securing the spacer against separation from the first cut-off member. This step may comprise applying an adhesive having a relatively low melting point between the socket 30 and the end portion 40 to releasably secure the spacer in the socket. Alternatively, a sleeve 46 having deformable tabs 50 thereon can be inserted into the socket (either before or after plug 42 has been installed in the socket). The end portion 40 of spacer 38 is then inserted into the sleeve 46 and the tabs 50 are deformed to retain the spacer 38 in the socket. As a third alternative, a retaining ring 57 is inserted into a groove 59 in the flange 32 of the first cut-off member 24. Then, a spacer having an end portion 40 with a shoulder 53 is inserted partway into the socket until the shoulder 53 moves past the teeth 61, as described above.

OPERATION

The cut-off 20, 20′ or 20″ is installed in a conduit for natural gas or some other substance. The plug 42 and the spacer 38 cooperate to keep the cut-off 20, 20′ or 20″ open. However, when the temperature exceeds the melting point of the plug 42, the plug 42 begins to melt. As the plug 42 melts, it occupies less volume in the socket 30 (because of its solid configuration and/or because some of the melted material flows out of the socket). This permits the end portion 40 of spacer 38 to penetrate further and further into the socket 30. As the spacer penetrates further into the socket 30, the first and second members 24 and 26, under the bias of the spring 36, move closer and closer together until they close the conduit. The plug material is preferably contained in the bottom of the socket 30. However, even if the plug material is displaced from the socket 30 by the spacer, it is sheltered from the flow through the conduit 22 and is unlikely to interfere with the closing of the cut-off.

The cut-off is of simple construction, and can be quickly and easily assembled. Soldering or reflowing the parts is not required. Moreover, because of the plug, the resulting cut-off is less likely to prematurely close, yet it reliably closes if the critical temperature is exceeded. The adhesive 44, or the tube 46 with deformable tabs 50, or the retaining ring 57, prevents the parts of the cut-off from being misaligned, without the difficult and time consuming soldering processes in the prior art. Finally, the problem of melting solder being carried by the flow in the conduit and interfering with the operation of the cut-off is reduced.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In a heat sensitive cut-off for blocking flow through a gas conduit or the like of the type comprising: first and second cut-off members disposed in the conduit which co-operate to block flow through the conduit when they are brought together, the first cut-off member having a socket therein; means for biasing the cut-off members together; a spacer between the first and second cut-off members for separating the cut-off members to permit flow through the conduit, the spacer having a portion penetrating partway into the socket in the first cut-off member; and a plug of a relatively low melting point material in the bottom portion of the socket for temporarily preventing the spacer from penetrating further into the socket, the socket and the spacer being configured so that when the plug melts the spacer can penetrate further into the socket sufficiently to allow the biasing means to move the cut-off members together to block the flow through the conduit, the improvement comprising means for preventing the spacer from separating from the first cut-off member the first cut-off member being positioned in the conduit upstream relative to the second cut-off member.

2. The cut-off according to claim 1 wherein the means for preventing the first cut-off member and the spacer from separating comprises a low temperature adhesive between the socket and the portion of the spacer in the socket.

3. The cut-off according to claim 1 wherein the means for preventing the first cut-off member and the spacer from separating comprises means on the first cut-off member for engaging the spacer.

4. The cut-off according to claim 1 wherein the plug is configured to occupy a greater volume in solid form than in liquid form, so that when the plug melts in the socket there is room for the spacer to penetrate further into the socket.

5. In a heat sensitive cut-off for blocking flow through a gas conduit or the like of the type comprising: first and second cut-off members disposed in the conduit which co-operate to block flow through the conduit when they are brought together, the first cut-off member having a socket therein; means for biasing the cut-off members together; a spacer between the first and second cut-off members for separating the cut-off members to permit flow through the conduit, the spacer having a portion penetrating partway into the socket in the first cut-off member; and a plug of a relatively low melting point material in the bottom portion of the socket for temporarily preventing the spacer from penetrating further into the socket, the socket and the spacer being configured so that when the plug melts the spacer can penetrate further into the socket sufficiently to allow the biasing means to move the cut-off members together to block the flow through the conduit, the improvement comprising: a shoulder on the spacer, and a tube press fit at least partway into the socket, and projecting therefrom, a portion of the tube being bent to engage the shoulder on the spacer and preventing the spacer from separating from the first cut-off member.

6. In a heat sensitive cut-off for blocking flow through a gas conduit or the like of the type comprising: first and second cut-off members disposed in the conduit which co-operate to block flow through the conduit when they are brought together, the first cut-off member having a socket therein; means for biasing the cut-off members together; a spacer between the first and second cut-off members for separating the cut-off members to permit flow through the conduit, the spacer having a portion penetrating partway into the socket in the first cut-off member; and a plug of a relatively low melting point material in the bottom portion of the socket for temporarily preventing the spacer from penetrating further into the socket, the socket and the spacer being configured so that when the plug melts the spacer can penetrate further into the socket sufficiently to allow the biasing means to move the cut-off members together to block the flow through the conduit, the improvement comprising means for preventing the spacer from separating from the first cut-off member, including a retainer held by the first cut-off member and engageable with a shoulder on the spacer.

7. The cut-off according to claim 6 wherein said portion of the spacer penetrating partway into the socket has a relatively large diameter upstream section and a smaller diameter downstream section providing said shoulder therebetween, said retainer comprising an annular retaining member having an inner edge margin projecting radially inwardly relatively to the socket for engagement with the shoulder on the spacer to prevent separation of the first cut-off member and the spacer.

8. The cut-off according to claim 7 further comprising a channel in said relatively large diameter upstream section of the spacer, said channel extending generally axially of the spacer from the upstream end of the spacer to said shoulder.

9. In a heat sensitive cut-off for blocking flow through a gas conduit or the like of the type comprising: first and second cut-off members disposed in the conduit which co-operate to block flow through the conduit when they are brought together, the first cut-off member having a socket therein; means for biasing the cut-off members together; a spacer between the first and second cut-off members for separating the cut-off members to permit flow through the conduit, the spacer having a portion penetrating partway into the socket in the first cut-off member; and a plug of a relatively low melting point material in the bottom portion of the socket for temporarily preventing the spacer from penetrating further into the socket, the socket and the spacer being configured so that when the plug melts the spacer can penetrate further into the socket sufficiently to allow the biasing means to move the cut-off members together to block the flow through the conduit, the improvement comprising means for preventing the spacer from separating from the first cut-off member, and said portion of the spacer penetrating partway into the socket being configured for permitting the venting of gas from the socket downstream past the spacer in the event said plug melts and the spacer moves further into the socket.

10. In a heat sensitive cut-off for blocking flow through a gas conduit or the like of the type comprising: first and second cut-off members disposed in the conduit which co-operate to block flow through the conduit when they are brought together, the first cut-off member being located upstream in the conduit relative to the second cut-off member, and having a socket therein opening on the downstream side; means for biasing the first cut-off member toward the second cut-off member; a spacer between the first and second cut-off members for separating the cut-off members to permit flow through the conduit, the spacer having a portion penetrating partway into the socket in the first cut-off member; a plug of a relatively low melting point material in the bottom portion of the socket for temporarily preventing the spacer from penetrating further into the socket, the socket and the spacer being configured so that when the plug melts the spacer can penetrate further into the socket sufficiently to allow the biasing means to move the cut-off members together to block the flow through the conduit; the improvement comprising means for preventing the first cut-off member and the spacer from separating, said means comprising a low temperature adhesive between the socket and the portion of the spacer in the socket.

11. In a heat sensitive cut-off for blocking flow through a gas conduit or the like of the type comprising: first and second cut-off members disposed in the conduit which co-operate to block flow through the conduit when they are brought together, the first cut-off member being located upstream in the conduit relative to the second cut-off member, and having a socket therein opening on the downstream side; means for biasing the first cut-off member toward the second cut-off member; a spacer between the first and second cut-off members for separating the cut-off members to permit flow through the conduit, the spacer having a portion penetrating partway into the socket in the first cut-off member; a plug of a relatively low melting point material in the bottom portion of the socket for temporarily preventing the spacer from penetrating further into the socket, the socket and the spacer being configured so that when the plug melts the spacer can penetrate further into the socket sufficiently to allow the biasing means to move the cut-off members together to block the flow through the conduit; the improvement comprising means for preventing the first cut-off member and the spacer from separating, comprising means on the first cut-off member for engaging the spacer.

12. The cut-off according to claim 11 wherein the spacer includes a shoulder thereon, wherein the first cut-off member comprises a tube press fit at least partway into the socket, and projecting therefrom, and wherein the means on the first cut-off member for engaging the spacer comprises a portion of the tube that has been bent to engage the shoulder on the spacer.

13. In a heat sensitive cut-off for blocking flow through a gas conduit or the like of the type comprising: first and second cut-off members disposed in the conduit which co-operate to block flow through the conduit when they are brought together, the first cut-off member being located upstream in the conduit relative to the second cut-off member, and having a socket therein opening on the downstream side; means for biasing the first cut-off member toward the second cut-off member; a spacer between the first and second cut-off members for separating the cut-off members to permit flow through the conduit, the spacer having a portion penetrating partway into the socket in the first cut-off member; a plug of a relatively low melting point material in the bottom portion of the socket for temporarily preventing the spacer from penetrating further into the socket, the socket and the spacer being configured so that when the plug melts the spacer can penetrate further into the socket sufficiently to allow the biasing means to move the cut-off members together to block the flow through the conduit; the improvement comprising means for preventing the first cut-off member and the spacer from separating, comprising a retainer held by the first cut-off member and engageable with a shoulder on the spacer.

14. The cut-off according to claim 13 wherein said portion of the spacer penetrating partway into the socket has a relatively large diameter upstream section and a smaller diameter downstream section providing said shoulder therebetween, said retainer comprising an annular retaining member having an inner edge margin projecting radially inwardly relative to the socket for engagement with the shoulder on the spacer to prevent separation of the first cut-off member and the spacer.

15. The cut-off according to claim 14 further comprising a channel in said relatively large diameter upstream section of the spacer, said channel extending generally axially of the spacer from the upstream end of the spacer to said shoulder.

16. In a heat sensitive cut-off for blocking flow through a gas conduit or the like of the type comprising: first and second cut-off members disposed in the conduit which co-operate to block flow through the conduit when they are brought together, the first cut-off member being located upstream in the conduit relative to the second cut-off member, and having a socket therein opening on the downstream side; means for biasing the first cut-off member toward the second cut-off member; a spacer between the first and second cut-off members for separating the cut-off members to permit flow through the conduit, the spacer having a portion penetrating partway into the socket in the first cut-off member; a plug of a relatively low melting point material in the bottom portion of the socket for temporarily preventing the spacer from penetrating further into the socket, the socket and the spacer being configured so that when the plug melts the spacer can penetrate further into the socket sufficiently to allow the biasing means to move the cut-off members together to block the flow through the conduit; the improvement comprising means for preventing the first cut-off member and the spacer from separating, and said portion of the spacer penetrating partway into the socket being configured for permitting the venting of gas from the socket downstream past the spacer in the event said plug melts and the spacer moves further into the socket.

17. In a heat sensitive cut-off for blocking flow through a gas conduit or the like of the type comprising: first and second cut-off members disposed in the conduit which co-operate to block flow through the conduit when they are brought together, the first cut-off member being located upstream in the conduit relative to the second cut-off member, and having a socket therein opening on the downstream side; means for biasing the first cut-off member toward the second cut-off member; a spacer between the first and second cut-off members for separating the cut-off members to permit flow through the conduit, the spacer having a portion penetrating partway into the socket in the first cut-off member; a plug of a relatively low melting point material in the bottom portion of the socket for temporarily preventing the spacer from penetrating further into the socket, the socket and the spacer being configured so that when the plug melts the spacer can penetrate further into the socket sufficiently to allow the biasing means to move the cut-off members together to block the flow through the conduit; the improvement comprising means for preventing the first cut-off member and the spacer from separating, and the plug being configured to occupy a greater volume in solid form than in liquid form, so that when the plug melts in the socket there is room for the spacer to penetrate further into the socket.

* * * * *